(12) United States Patent
Norling et al.

(10) Patent No.: US 7,896,520 B1
(45) Date of Patent: Mar. 1, 2011

(54) REPOSITIONABLE LIGHTING DEVICE FOR GRILLING UTENSILS

(76) Inventors: Jeff L. Norling, Waconia, MN (US); Curt B. Anderson, Victoria, MN (US)

( * ) Notice: Subject to any disclaimer, the term of this patent is extended or adjusted under 35 U.S.C. 154(b) by 414 days.

(21) Appl. No.: 12/037,444

(22) Filed: Feb. 26, 2008

(51) Int. Cl.
*F21V 21/00* (2006.01)

(52) U.S. Cl. .......................... 362/191; 362/398; 362/419

(58) Field of Classification Search ................. 362/419, 362/191, 398, 422, 428
See application file for complete search history.

(56) References Cited

U.S. PATENT DOCUMENTS

| | | | | | |
|---|---|---|---|---|---|
| 2,888,617 | A | * | 5/1959 | Baumet | 335/295 |
| 3,325,639 | A | * | 6/1967 | King | 362/270 |
| 3,917,940 | A | * | 11/1975 | Duddy | 362/398 |
| 4,506,317 | A | * | 3/1985 | Duddy | 362/396 |
| 4,533,982 | A | * | 8/1985 | Kozar | 362/183 |
| 5,964,517 | A | | 10/1999 | Adams | |
| 6,986,590 | B1 | | 1/2006 | Padden | |
| 7,008,077 | B2 | * | 3/2006 | Raichlen | 362/120 |
| 2007/0103917 | A1 | * | 5/2007 | Wu et al. | 362/398 |

* cited by examiner

*Primary Examiner* — Ali Alavi

(74) *Attorney, Agent, or Firm* — Sherril Law Offices, PLLC

(57) ABSTRACT

The invention is a repositionable lighting device. It includes a light element, a stanchion, a magnetic base and ball and socket joint. The light element projects a light beam about a longitudinal axis. The housing has defined first and second longitudinal ends. The stanchion extends laterally from the housing positioned between the first and second lateral ends of the housing. The ball and socket joint attaches a magnetic base to the distal end of the stanchion allowing the light beam to be adjusted to the desired position.

16 Claims, 2 Drawing Sheets

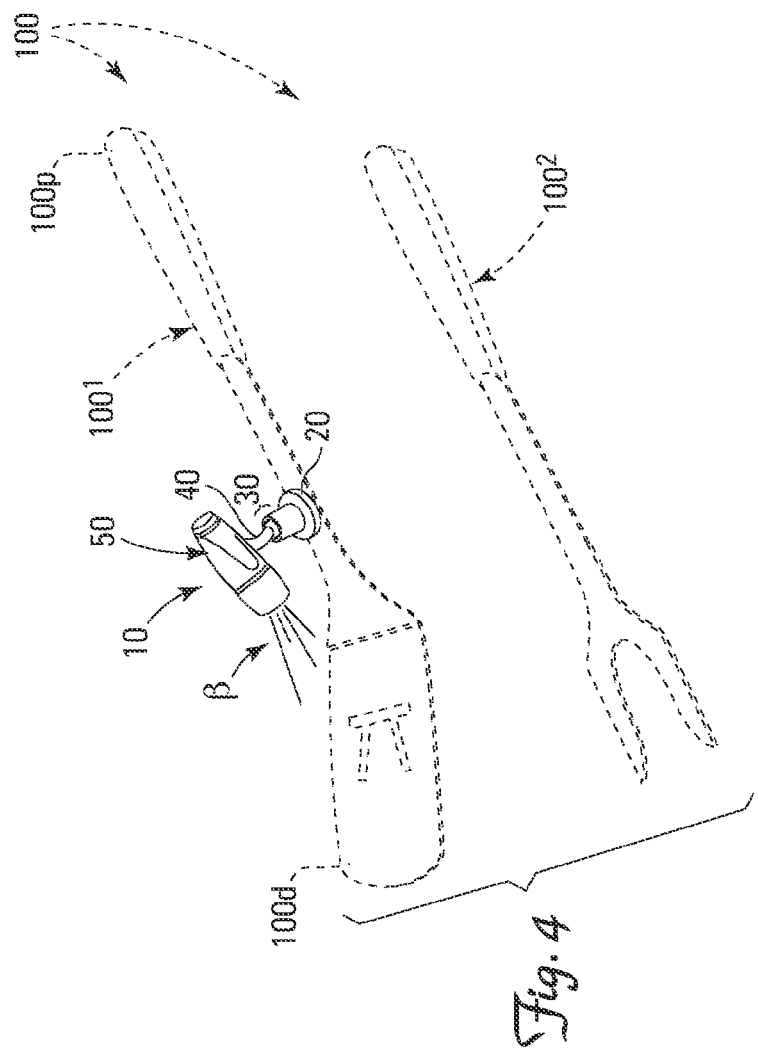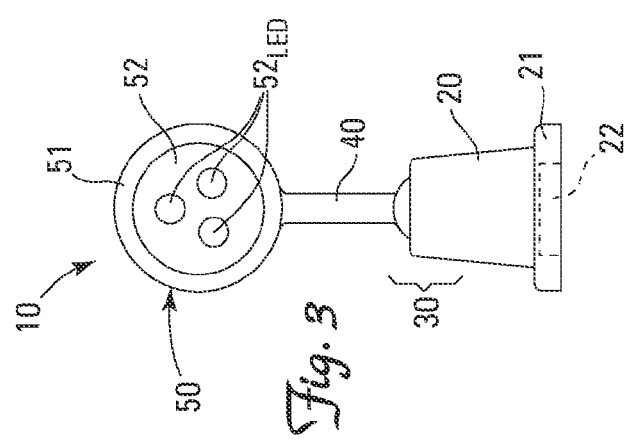

REPOSITIONABLE LIGHTING DEVICE FOR GRILLING UTENSILS

BACKGROUND

Grilling is a popular outdoor activity. Throughout the process of grilling a person frequently uses multiple different grilling utensils to manipulate different items on an outdoor grill. Typically, this grilling activity takes place in the late evening and into the night.

A number of devices have been developed to illuminate a grilling area. Exemplary illuminating devices are described in U.S. Pat. Nos. 5,964,517, 7,008,077, and 6,986,590. While generally effective for illuminating the "operating end" of a grilling utensil, a need exists for an improved means and method of providing such illumination.

SUMMARY OF THE INVENTION

A first aspect of the invention is a repositionable lighting device. It includes a light element, a stanchion, a magnetic base and ball and socket joint. The light element includes a light source within a housing to project a light beam about a longitudinal axis. The housing has defined first and second longitudinal ends. The stanchion extends laterally from the housing with a proximal end attached to the housing and a distal end laterally spaced from the housing and positioned between the first and second lateral ends of the housing. The ball and socket joint includes a ball element and a socket element. One of the elements is attached to the magnetic base and the other element is attached to the distal end of the stanchion.

A second aspect of the invention is a method of lighting a utensil using the first aspect of the invention. Briefly, the method includes the steps of 1) obtaining a grilling utensil having a magnetically attracted area, 2) obtaining the repositionable lighting device, 3) magnetically attaching the lighting device to the grilling utensil.

BRIEF DESCRIPTION OF THE DRAWINGS

FIG. 3 is a front view of the invention depicted in FIG. 1.

FIG. 4 is a side view of the invention depicted in FIG. 1 attached to a grilling utensil and depicted an alternate grilling utensil.

DETAILED DESCRIPTION OF THE INVENTION INCLUDING A BEST MODE

Nomenclature

Figure 2:
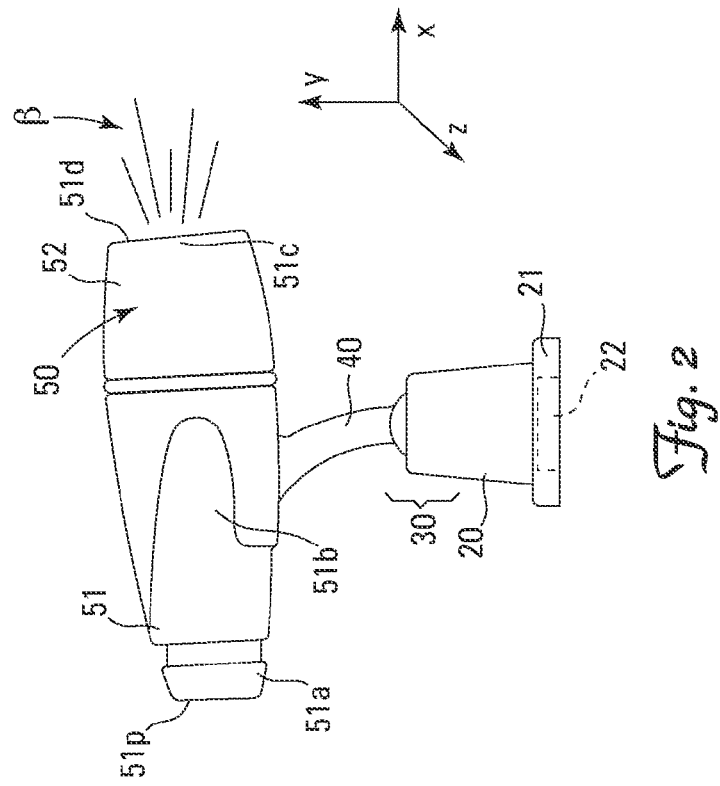
FIG. 2 is a fully assembled side view of the invention depicted in FIG. 1.

β Light Beam
10 Repositionable Lighting Device
20 Magnetic Base
21 Magnet Enclosure
22 Magnet
30 Ball and Socket Joint
31 Ball Element
32 Socket Element
39 Channel
40 Stanchion
40$d$ Distal End of Stanchion
40$p$ Proximal End of Stanchion
50 Light Element
51 Housing
51$d$ First Longitudinal End of Housing
51$p$ Second Longitudinal End of Housing
51$a$ On/Off Button
51$b$ Middle Housing Section
51$c$ Lens Cap
52 Light Source
52$_{LED}$ Light Emitting Diodes
100 Utensil
100$d$ Food Contacting End of Utensil
100$p$ Handgrip End of Utensil
100$^1$ First Utensil
100$^2$ Second Utensil
x Central Longitudinal Axis
y Central Latitudinal Axis
z Central Transversal Axis

Construction

Referring to FIGS. 1-4, a first aspect of the invention is a device 10 for detachably mounting a repositionable light source 52 to a grilling utensil 100. The repositionable lighting device 10 includes a light element 50, a stanchion 40, a ball and socket joint 30 including a mated set of a ball 31 and a socket 32, and a magnetic base 20.

Figure 1:
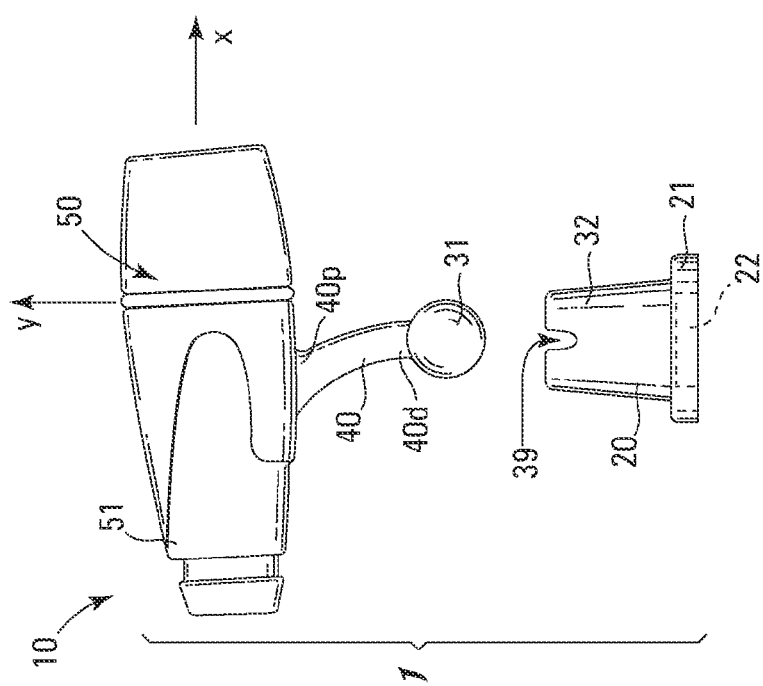
FIG. 1 is an exploded side view of one embodiment of the invention.

A specific embodiment of the light element 50 is depicted in FIGS. 1-3. The light element 50 extends along a longitudinal axis x and includes a light source 52 retained within a suitable housing 51. The housing 51 defines a proximal longitudinal end 51$p$, and a distal longitudinal end 51$d$, and includes a middle section 51$b$ with an On/Off Button 51$a$ at one longitudinal x end and a lens cap 51$c$ at the other longitudinal x end. The light source 52 includes a plurality of light emitting diodes 52$_{LED}$ which project a light beam β about the longitudinal axis x.

As depicted in FIGS. 1-3, the stanchion 40 is a rigid structure extending laterally y from a proximate end 40$p$ attached to the housing 50 to a distal end 40$d$ spaced a lateral y distance from the housing 50 and positioned between the distal longitudinal end 51$d$ and proximal longitudinal end 51$p$ of the housing 50. The ball element 31 is attached to the distal end 40$d$ of the stanchion 40.

A specific embodiment of the magnetic base 20 is depicted in FIG. 1. The depicted magnetic base 20 includes a magnet 22 retained within an enclosure 21. The socket element 32 of the ball and socket joint 30 is attached to and extends from the magnetic base 20. Alternatively, the ball element 31 may be attached to the magnetic base 20 and the socket element 32 attached to the distal end 40$d$ of the stanchion 40.

The ball and socket joint 30 provides the stanchion 40 with three degrees of rotational freedom (i.e., rotation about the longitudinal x, lateral y, and transverse z axes) relative to the fixed magnetic base 20. The specific embodiment of the ball and socket joint 30 depicted in FIG. 1 includes a channel 39 in the socket element 32 for purposes of increasing the rotation permitted about the transverse axis z. The depicted ball and socket joint 30 permits the stanchion 40 to rotate approximately 60° about the longitudinal axis x, 360° about the lateral axis y, and approximately 180° about the transverse axis z. This degree of rotational freedom allows the light element 50 to be adjusted as desired to project the light beam β onto the food contacting end 100$d$ of a utensil 100.

Other types of joints may also be usefully employed in the present invention so long as the desired adjustability is provided by the joint. A nonexhaustive list of such joints includes specifically, but not exclusively, a universal joint or gimbal joint that allows the range of motion needed to properly align the light beam β and hold the device 10 in place once the desired alignment is achieved.

The repositionable lighting device 10 is preferably a lightweight device that when attached to a utensil 10 does not add significant weight to the utensil 100 which includes a food contacting end 100*d* and a handgrip end 100*p*. The repositionable lighting device 10 preferably weighs less than about ten ounces, and most preferably weighs less than six ounces.

The specific embodiment depicted in the Figures positions the on/off button Ma at the second longitudinal end 51*p* of the housing 51. Of course, those skilled in the art would recognize that the on/off button 51 could be positioned anywhere on the housing 51.

Use

As depicted in FIG. 4, the repositionable lighting device 10 can be used with a plurality of grilling utensils 100 to illuminate a grill or barbecue [not shown] allowing a person [not shown] grilling at night to see the food [not shown] being grilled. The device 10 is employed by simply, (1) attaching the device 10 to a grilling utensil 100 at a magnetically attracted area on the utensil 100, and, (2) positioning the light element 50 by rotating the stanchion 40 about the longitudinal x, lateral y, and transverse z axes so that the light beam β is directed to illuminate the food contacting end 100*d* of the utensil 100.

When the user [not shown] desires to operate the device 10 on a second grilling utensil 100$^2$ the device 10 is simply detached from the first utensil 100$^1$ and magnetically attached to the second utensil 100$^2$, with the light element 50 repositioned as necessary to illuminate the food contacting end 100*d* of the second utensil 100$^2$ as previously described above.

The device 10 may be detached from the utensil 100 as desired, such as when the utensil 100 is being washed.

We claim:

1. A repositionable lighting device comprising:
   (a) a light source retained within a housing to project a light beam about a longitudinal axis, the housing defining first and second longitudinal ends,
   (b) a stanchion extending laterally from the housing with a proximal end attached to the housing and a distal end laterally spaced from the housing and positioned between the first and second longitudinal ends of the housing,
   (c) a magnetic base, and
   (d) a ball and socket joint with a ball element and a socket element, wherein one of the elements is attached to the magnetic base and the other element is attached to the distal end of the stanchion.

2. The device of claim 1 wherein the socket element is attached to the magnetic base.

3. The device of claim 1 wherein the ball element is attached to the magnetic base.

4. The device of claim 1 wherein the stanchion is a rigid structure.

5. The device of claim 1 wherein the device Weighs less than 6 ounces, exclusive of any power source.

6. The device of claim 1 wherein the light source is a plurality of light emitting diodes.

7. A method of lighting a utensil, comprising:
   (a) obtaining a grilling utensil having a magnetically attracted area,
   (b) obtaining a repositionable lighting device, comprising at least:
      (1) a light source retained within a housing to project a light beam about a longitudinal axis, the housing defining first and second longitudinal ends,
      (2) a stanchion extending laterally from the housing with a proximal end attached to the housing and a distal end laterally spaced from the housing and positioned between the first and second longitudinal ends of the housing,
      (3) a magnetic base, and
      (4) a ball and socket joint with a ball element and a socket element, wherein one of the elements is attached to the magnetic base and the other element is attached to the distal end of the stanchion housing,
   (c) magnetically attaching the lighting device to the grilling utensil.

8. The method of claim 7 wherein the light source is oriented to direct light towards an end of the utensil configured and arranged to contact food.

9. The method of claim 7 further comprising the steps of (i) detaching the device from the utensil and then (ii) washing the utensil.

10. The method of claim 7 wherein the obtained utensil is a first utensil, and the method further comprises the steps of (i) obtaining a second utensil, (ii) detaching the device from the first utensil, and (iii) magnetically attaching the detached device to the second utensil.

11. The method of claim 7 wherein the socket element of the device is attached to the magnetic base.

12. The method of claim 7 wherein the ball element of the device is attached to the magnetic base.

13. The method of claim 7 wherein the stanchion of the device is a rigid structure.

14. The method of claim 7 wherein the device weighs less than 6 ounces, exclusive of any power source.

15. The method of claim 7 wherein the light source is a plurality of light emitting diodes.

16. A repositionable lighting device comprising:
   (a) a light source retained within a housing capable of projecting a light beam about a first vector,
   (b) a magnetic base effective for stably mounting the lighting device to a planar surface, wherein the planar surface defines a reference plane extending in a longitudinal direction and a transverse direction, and
   (c) a linkage interconnecting the housing and the base, operable for repositioning the housing and the base as between a first static configuration Wherein the first vector projects away from the reference plane along a longitudinal axis, a second static Configuration wherein the first vector projects away from the reference plane along a transverse axis, a third static configuration wherein the first vector projects towards the reference plane along the longitudinal axis, and a fourth static configuration wherein the first vector projects towards the reference plane along the transverse axis.

\* \* \* \* \*